Nov. 16, 1965  G. B. MADDEN  3,217,415
NAVIGATIONAL DEVICE

Filed Oct. 16, 1963  3 Sheets-Sheet 1

INVENTOR
GEORGE B. MADDEN

BY *[signature]* ATTORNEY

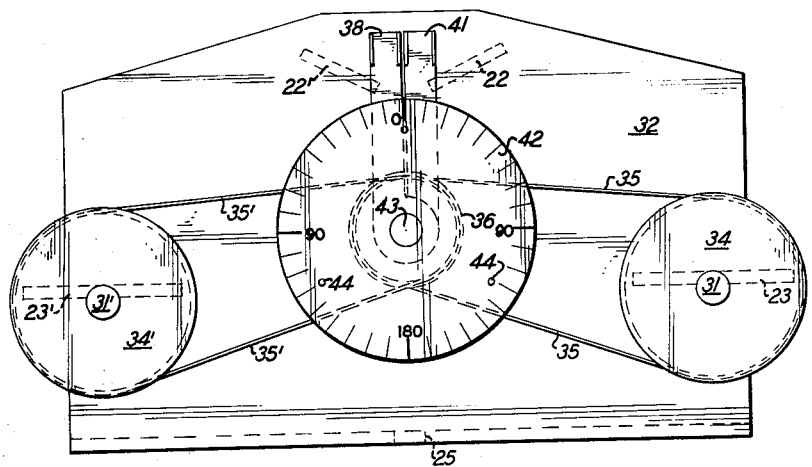

INVENTOR
GEORGE B. MADDEN

United States Patent Office 3,217,415
Patented Nov. 16, 1965

3,217,415
NAVIGATIONAL DEVICE
George B. Madden, Newport, R.I. (% T. G. Gillespie, Jr., 2 Park Ave., Room 810, New York 16, N.Y.)
Filed Oct. 16, 1963, Ser. No. 316,620
6 Claims. (Cl. 33—66)

This invention is concerned with the art of navigation. More particularly, the invention is concerned with the field of terrestrial navigation, and particularly, piloting.

One of the methods heretofore utilized in determining the position of a ship or boat is the use of the starpointer or three-arm protractor method of piloting. This involves simultaneous readings of the two horizontal angles between three objects of known positions on a chart. These angles are then transferred to a three-arm protractor and the protractor placed on the chart and moved about until the arms pass through positions of the three objects. The position of the ship is thus determined as it must be at the pivot point of the protractor arms. This method of determining position possesses certain disadvantages in that it has in the past involved simultaneous utilization of two systems, such as sextants, for measurement of the angles and obviously require the presence of two persons, each to use one of the sextants.

The present invention involves means enabling measurement of the two angles conveniently by one person. Further, the present invention provides means for fixing these angles on a protractor, which can then be placed on a chart and utilized as aforedescribed.

The present invention embraces, in a navigational device, the combination of a first sighting means, a second sighting means adjacent said first sighting means, a third sighting means adjacent said first sighting means and oppositely disposed to said second sighting means, said second and third sighting means being pivotally mounted and adapted to sight on objects angularly disposed on opposite sides of the line of sight of said first and second means, means associated with said second and third sighting means adapted to transmit the images received by said second and third sighting means into lines of sight parallel to the lines of said first sighting means, and means for measuring the angles between the lines of sight of said first and second sighting means and the lines of sight of said first and third sighting means.

In a further embodiment, the present invention embraces the combination above described in which the means associated with second and third sighting means adapted to transmit images received by said second and third sighting means comprising means adapted to transmit light rays received by said second and third sighting means downwardly and toward the first sighting means, stabilizing means adapted to receive said inwardly transmitted light rays and to transmit said light rays in a line of sight parallel to the line of sight of said first sighting means, said stabilizing means being connected to their respective sighting means and means adapted to receive the light rays transmitted by said fixed line to positions vertically disposed with relation to the image received by said first sighting means.

Referring to the drawings, FIG. 1 illustrates the horizontal angles to be measured by use of the apparatus of the present invention.

FIGS. 3, 4 and 5 are, respectively, plan and elevation and side views of an embodiment of the present invention.

Figure 1:
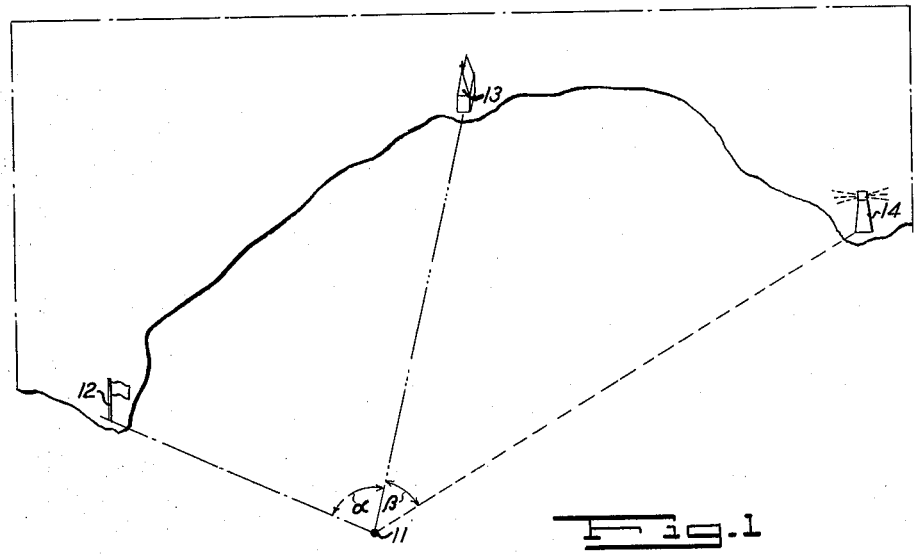

Referring to FIG. 1, there is illustrated a shoreline on which are located three objects of known position, particularly, a flagstaff 12, a church spire 13 and a lighthouse 14. A ship located at position 11 would, of course, have the angles alpha and beta between the lines of sight, respectively, to the flagstaff and the church spire, and to the church spire and the lighthouse.

Figure 2:
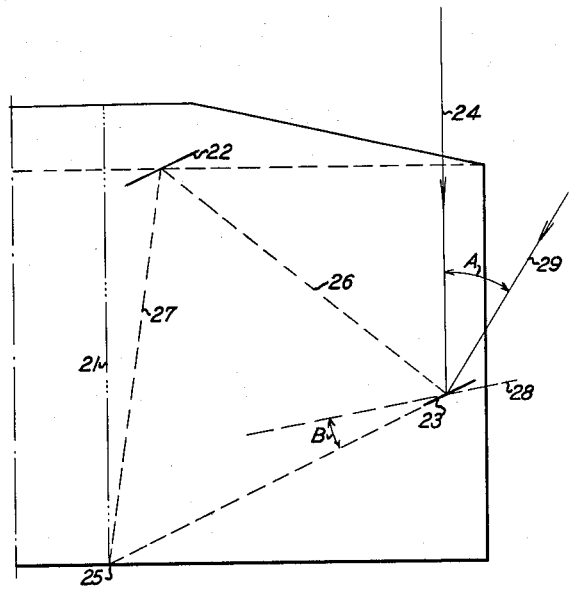
FIG. 2 is a schematic representation of an embodiment of a part of the present invention.

Referring to FIG. 2, there is shown schematically a first sighting means 21 and disposed to the right thereof, a second sighting means. It will be realized that a third sighting means which is a mirror image of the second sighting means is disposed to the left of the first sighting means 21. Referring to the second sighting means, there is disclosed a first reflecting means 22 fixedly disposed at an angle to the line of sight 21 of the first sighting means 25; a second reflecting means 23, which is pivotally mounted and as shown is disposed parallel to the first reflecting means 22. In such position an object sighted along the line of sight 24 will appear to the observer whose eye is at position 25 to be in the same line of sight as that of the first sighting means 21. This is shown by the lines 24, 26 and 27. When the second reflecting means 23 is pivoted to the position shown by the dotted line 28, the object viewed at position 25 will, of course, be in the line of sight 29. The angle between the object sighted along the line of sight 29 will be disposed at a horizontal angle A from an object simultaneously sighted along the line of sight 21. It is to be noted that the angle B through which the second reflecting means 28 pivoted from its zero position parallel to the first reflecting means 22 is one-half the angle A.

Figure 5:
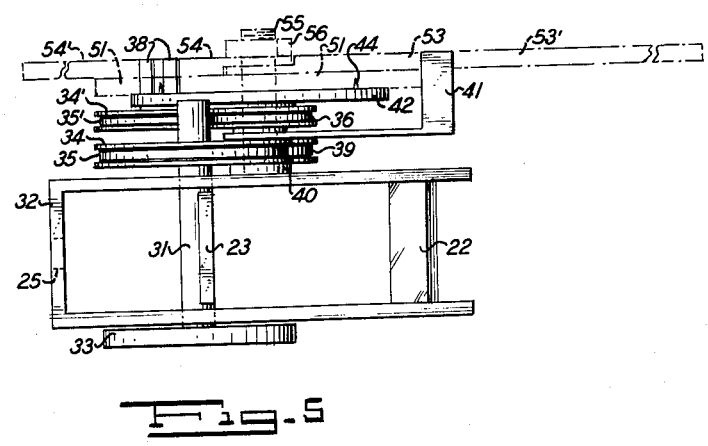

Referring to FIGS. 3, 4 and 5, there are shown, respectively, plan, elevation and side view 5 of an embodiment of the present invention. Referring to FIG. 4, there is shown the aperture 25 through which is observed the image in the line of sight of the first sighting means. A second reflecting means 23 is shown mounted on the pivot post 31. This pivot post passes through frame 32 by which it is supported and is attached below to a turning disc 33 and above a wheel 34. The wheel 34 is, in turn, connected by the belt 35 to wheel 39 mounted on a shaft 40 to which is attached an arm 41 (shown in FIG. 3).

Referring again to FIG. 4, a second reflecting means 23' is shown mounted on the pivot post 31'. This pivot post passes through frame 32 by which it is supported and is attached to a turning disc 33' and wheel 34'. Wheel 34 is in turn connected by the belt 35' to a wheel 36 which is attached to a shaft 37, to which is attached an arm 38 (shown in FIG. 3). Also shown in FIG. 3 is a disc 42 supported by and affixed to a central shaft 43. Disc 42, as shown on FIG. 3, has degree markings thereon so that when the arms 38 and 41 are pivoted the angle from the line of sight of the first sighting means can be measured. Also on disc 42 are the projections 44 adapted to hold in place a later to be described protractor. The shaft 37 supporting the wheel 36 is a hollow shaft pivotally and annularly disposed about the shaft 43; the shaft 40 supporting the wheel 39 is a hollow shaft pivotally and annularly disposed about the hollow shaft 37.

Referring again to FIG. 3, it is to be noted that the wheels 34 and 34' are of such size as to possess twice the circumference of the wheels 36 and 39, respectively. Thus, when the wheel 34 to which is attached the right-hand second reflecting means 23 is pivoted through angle B as shown in FIG. 2, the angle through which the wheel 39 is pivoted will be twice angle B and thus equal to angle A as shown in FIG. 2. Accordingly, the pointer arm 41 will measure the horizontal angle between the line of sight of the first sighting means and the line of sight of the object observed by the second sighting means.

Referring to FIG. 5, there is shown a side view of FIG. 4. This figure particularly illustrates the arm 41 shown attached to the wheel 39. It is to be noted that this arm pivots circumferentially around the disc 42 on the right-hand side of the line of sight of the first sighting means and thus there can be obtained a reading of the horizontal angle between the line of sight of the first sighting means and that of the object sighted by the second sighting means disposed on the right side of the line of sight of the first sighting means. Similarly, the arm 38 pivots to the left side of the line of sight of the first sighting means and there is obtained a reading of the horizontal angle between the line of sight of the first sighting means and the object sighted by said third sighting means.

Figure 6:
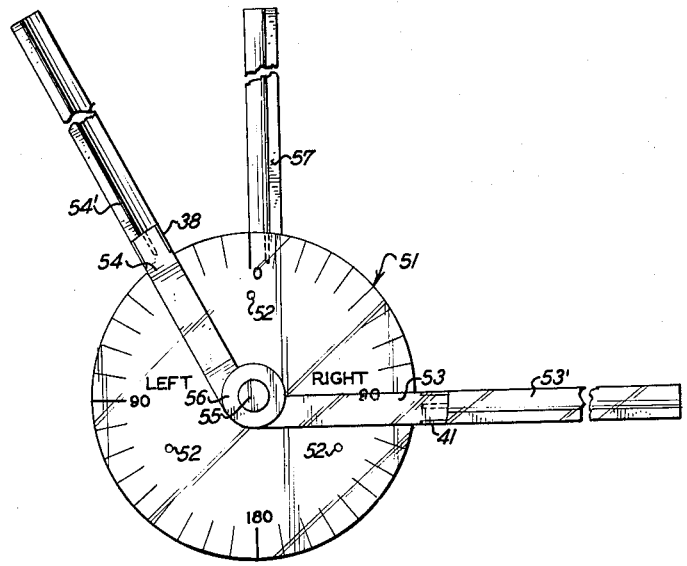
FIG. 6 is a plan view of the protractor element.

Referring to FIG. 6, there is shown a protractor in the form of a disc 51 having the holes 52 disposed so as to engage the projections 44 shown in FIG. 3. The disc 51 also has right arm 53 and left arm 54 pivotally mounted around a shaft 55 which is equipped with a lock nut 56. It will be observed that the holes 52 are so positioned in the disc 51 as to engage the disc 51 when placed on the disc 42 shown in FIG. 3 to position the zero point of the protractor disc 51 in the line of sight of the first sighting means. It will be realized by observers that the arms 53 and 54 shown in FIG. 6 are adapted to engage, respectively, the arms 38 and 41 shown in FIG. 5. Thus, when the wheels 36 and 39 pivot and cause movement of the arms 38 and 41, the right arm 53 and the left arm 54 of the protractor disc 51 will pivot.

It will be realized that FIGS. 3, 4 and 5 illustrate the embodiment of the present invention, enabling the simultaneous observation of the horizontal angles between three objects. In operation, the eye is placed at the sighting aperture 25 and the apparatus maneuvered so as to place the middle object under observation in the line of sight of the first sighting means. While maintaining this line of sight on the middle object, the wheels 33 and 33' are pivoted to bring into view through the aperture 25 the other two objects under observation. This pivoting, of course, causes movement of the wheels 34 and 34' as well as wheels 36 and 39 and causes angular movement in a horizontal plane around disc 42 and arms 41 and 38. When the observation is completed the angles can be read from the markings on disc 42 and transferred to a three arm projector and the position determined as above described with reference to FIG. 1.

Alternatively, as shown in FIG. 5, the protractor disc 51 can be positioned on the disc 42 and the right arm 53 engaged in the arm 41. Thus, as the observation is completed, the lock nut 56 can be tightened and the protractor disc 51 lifted from disc 42 and utilized as a three arm protractor. In such event there are attached as shown in FIG. 6 to the protractor disc 51 the projection arm 54' which is affixed to the left arm 54, the projection arm 53' which is affixed to the right arm 53 and the projection arm 57 which is inserted along the zero position of the disc 51. With the lock nut 56 tightened, this entire assembly can then be utilized as a three-arm protractor as above described.

While in the foregoing embodiment there have been described particular mechanical means of accomplishing the object of the present invention it will be realized that there are a variety of mechanical equivalents other than the wheel and belt mechanisms described above which can accomplish the same effect. For example, for the wheel and belt assembly there can be substituted wheels which engage each other by friction and accomplish the same relative movement. As a further alternate there can be utilized gears of such respective ratios as to accomplish the same relative movement. Further mechanical equivalents will occur to those skilled in the art.

The reflecting means 22 and 23 conveniently are mirrors on which is shown a hairline for accurate sighting on the objects being observed. Further, any reflecting surface can be utilized to accomplish the same effect such as, for instance, utilization of a prism system.

It will be realized that each of the sighting means can utilize systems for magnification such as, for example, telescopic means to enable more accurate observations of the angles between the three objects being observed.

In view of the foregoing disclosures, variations and modifications thereof will be apparent to one skilled in the art and it is intended to include within the invention all such variations and modifications except as do not come within the scope of the appended claims.

What is claimed is:

1. In a navigational apparatus, the combination of a first sighting means; a second and a third sighting means disposed on opposite sides of the line of sight of said first sighting means, said second and third sighting means each comprising a fixed first reflecting means disposed at an angle to a line perpendicular to said line of sight and as to be viewed from the viewing end of said first sighting means, and a pivotally mounted second reflecting means disposed farther away from said line of sight and nearer the viewing end of said first sighting means than said first reflecting means and angular measurement means cooperating with each of said second and third sighting means and adapted to indicate zero when said second reflecting means is parallel to said first reflecting means and to indicate twice the actual angle of rotation of said second reflecting means.

2. In a navigational apparatus, the combination of a first sighting means, a second and a third sighting means disposed on opposite sides of the line of sight of said first sighting means, said second and third sighting means each comprising a fixed first reflecting means disposed at an angle to a line perpendicular to said line of sight and as to be viewed from the viewing end of said first sighting means, and a pivotally mounted second reflecting means disposed farther away from said line of sight and nearer the viewing end of said first sighting means than said first reflecting means, and means for measuring the angles of rotation of said second reflecting means and means for indicating twice such angles on a common circular means bearing degree markings on opposite sides of a zero point on said circular means, said zero point referring to the line of sight of said first sighting means.

3. The apparatus of claim 2 in which the means for indicating twice such angles is a disc having two arms which arms pivot and indicate twice the respective angles of rotation of said second reflecting means.

4. The apparatus of claim 3 in which said disc having two arms is removable and is adapted to be temporarily positioned on the remainder of said apparatus in a position such that its zero point refers to the line of sight of said first sighting means.

5. The apparatus of claim 4 in which said arms and, at the zero mark, said disc, are adapted to receive extensions.

6. The apparatus of claim 5 in combination with extensions.

References Cited by the Examiner
UNITED STATES PATENTS

| | | | |
|---|---|---|---|
| 2,419,597 | 4/1947 | Rushmore | 33—65 |
| 2,567,053 | 9/1951 | Catravas | 33—70 |
| 2,697,234 | 12/1954 | Sturdevant | 33—64 |
| 2,946,256 | 7/1960 | Tiffany | 88—2.4 |
| 2,953,060 | 9/1960 | Carbonara | 88—2.4 |

FOREIGN PATENTS

| | | |
|---|---|---|
| 9,600 | 4/1897 | Great Britain. |

ISAAC LISANN, *Primary Examiner.*